United States Patent [19]

Vollmer et al.

[11] Patent Number: 4,681,493

[45] Date of Patent: Jul. 21, 1987

[54] MEANS FOR MAINTAINING AXIAL STRESS ON A DOWEL ASSEMBLY

[75] Inventors: Helmut Vollmer, Balzers, Liechtenstein; Heinz Kousek, Feldkirch; Elmar Maier, Tisis, both of Austria

[73] Assignee: Hilti Aktiengesellschaft

[21] Appl. No.: 731,555

[22] Filed: May 7, 1985

[51] Int. Cl.⁴ .............................................. F16B 31/04
[52] U.S. Cl. ......................................... 411/8; 411/19; 411/57; 411/535
[58] Field of Search ...................... 411/8, 9, 10, 11, 12, 411/13, 14, 15, 19, 20, 45, 55, 57, 60, 69, 535, 536, 537, 916, 434

[56] References Cited

U.S. PATENT DOCUMENTS

| | | | |
|---|---|---|---|
| 2,571,265 | 10/1951 | Lueufven | 441/434 |
| 3,021,747 | 2/1962 | Garrett | 411/11 |
| 3,462,180 | 8/1969 | Bunyan | 411/434 |
| 3,521,454 | 7/1970 | Dodds | 411/537 X |
| 3,604,306 | 9/1971 | Dehholm | 411/535 |
| 4,182,189 | 1/1980 | Deck et al. | 411/9 |

FOREIGN PATENT DOCUMENTS

| | | | |
|---|---|---|---|
| 2455788 | 8/1976 | Fed. Rep. of Germany | 411/434 |
| 2950254 | 6/1981 | Fed. Rep. of Germany | 411/9 |
| 1433249 | 4/1976 | United Kingdom | 411/10 |

*Primary Examiner*—Thomas J. Holko
*Attorney, Agent, or Firm*—Toren, McGeady and Goldberg

[57] ABSTRACT

A dowel assembly to be anchored in a borehole in a receiving material includes a container positioned around the axis of the borehole and located between an abutment at one end of the dowel assembly and the receiving material into which the assembly is inserted. The container is formed of two parts with one part being telescopically displaceable into the other. An hydraulic mass capable of expanding when mixed with a reaction liquid is filled into the container. The expandable hydraulic mass maintains the force acting on the dowel assembly when there is relaxation of the force originally generated between the dowel assembly and the receiving material. The container has openings through which the reaction liquid can pass into contact with the hydraulic mass. The hydraulic mass can be activated by immersing the container in water.

10 Claims, 9 Drawing Figures

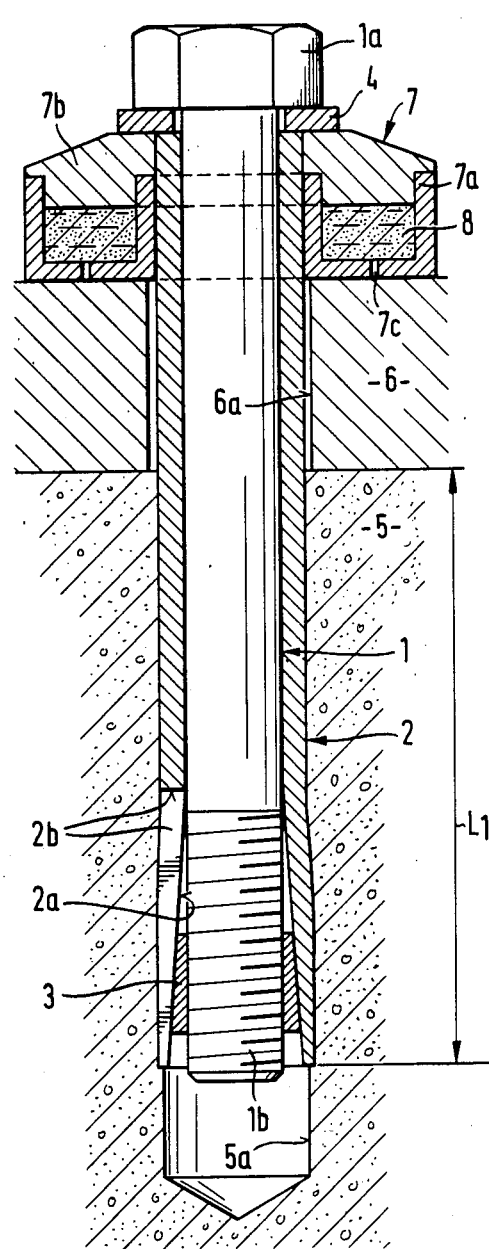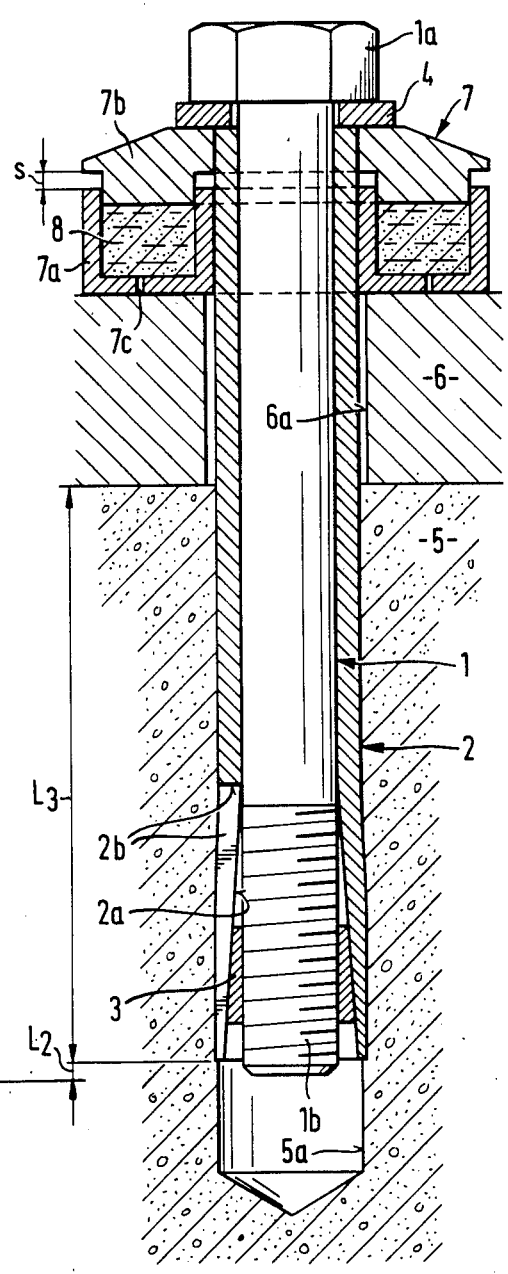

MEANS FOR MAINTAINING AXIAL STRESS ON A DOWEL ASSEMBLY

BACKGROUND OF THE INVENTION

The present invention is directed to a dowel assembly which can be anchored in a borehole in a receiving material, such as concrete, masonry or the like. An abutment on the dowel assembly is stressed relative to the receiving material so that a part can be placed between the abutment and the receiving material so that it is secured on the surface of the material.

Dowel assemblies intended for higher load as well as cyclic loads are loaded in the axial direction after being anchored in the receiving material. The axial loading is largely independent of whether the dowel assembly is anchored in the receiving material in an expansion operation, by a positive locking engagement, or by an adhesive connection, such as by using a cement product. The axial loading is of great significance if high dynamic forces act on the dowel assembly through a connection, if the static friction between the receiving material and the connection is required for absorbing lateral stresses or for supporting brackets with long cantilevered sections. Research has revealed that the axial load generated by the anchoring of the dowel assembly in the receiving material is considerably reduced after a short period of time. This reduction in the axial loading, which can be ascribed to a "flowing" or relaxing of the receiving material, can amount to 30 to 80% of the original axial force. The reduction develops immediately after the establishment of the axial force, it reaches approximately 25% after about two hours and amounts to about 35% after approximately seven days. An increase in the original axial force (for instance by approximately 50% above the anticipated force) can, however, not prevent the reduction in the axial force below the required force after a short time and, accordingly, the desired axial force cannot be maintained. By loading the dowel assembly to a multiple of the desired load, the time in which the reduction of the applied axial load below the required load is merely delayed. By overloading the dowel when it is originally stressed, the strength of the receiving material may be exceeded which could result in immediate or subsequent damage.

Up to the present time, one means for avoiding this disadvantageous phenomenon has been to retighten the dowel assembly by a certain amount after the original axial load has dropped off. The retightening step, however, requires time and money and is relatively difficult to control. Furthermore, the accessibility of the attachment after the installation of the dowel assembly is completed is often very limited. Moreover, such an adjustment feature has only a delaying action.

Another solution to this known problem has been to place spring elements between the abutment on the dowel assembly and the receiving material or the component can be attached to the receiving material with the maximum load provided exceeding the allowable load on the dowel. Such spring members are complicated and of considerable size. Further, they can be partly or completely impaired by corrosion. The sizing and location of the spring elements also provides problems. Since a number of spring elements are required for the desired spring characteristic, there is the possibility that a portion of the spring elements may be lost or incorrectly installed during the placement of the dowel assembly so that the desired spring characteristic is not achieved.

SUMMARY OF THE INVENTION

The primary object of the present invention is to provide a dowel assembly in which any reduction of the original axial force developed on the assembly with its detrimental effect on the anchoring procedure, can be compensated reliably with a simple means and in an economic manner.

In accordance with the present invention, an expandable container with a space for holding a hydraulic mass capable of expanding in the direction of the dowel axis, is positioned between the abutment on the dowel assembly and the adjacent surface of the receiving material. Alternatively, the container can be located between the abutment and the surface of a component to be secured on the surface of the receiving material. Hydraulic masses of a certain composition have the ability to swell or expand during the setting operation, that is, the hydraulic mass increases in its volume. If the increase in volume is contained, considerable pressures are developed within the mass. This phenomenon is used, for example, in non-explosive blasting. Since the container can expand in the direction of the axis of the dowel assembly, because of its configuration, an equalization of any change in length of the dowel assembly secured within the receiving material due to "flowing" can be attained. As a result, the original axial stress applied to the dowel assembly can be essentially maintained.

It is possible to locate the mass within a container closed on all sides by a welding or soldering operation. The walls of such a container extending in the axial direction of the dowel assembly must be expandable. Such expansion can be achieved in a container with a bellows-like design. A bellows-like container is, however, very complicated and expensive. For a simple arrangement and handling of the container, it is advantageous if the container is formed of two parts, one a bottom portion and the other a cover portion with at least one of the parts forming the space for the hydraulic mass. In such a container it would be possible to fill the hydraulic mass into the space immediately before it is used and to close the space by joining the two parts together. With the pressure rise developed when the hydraulic mass expands or swells, the two parts of the container can be displaced apart in the axial direction of the dowel assembly and thus serve for equalizing the axial force occurring due to a releasing action in the receiving material.

The pressure developed in the container due to the swelling or expanding action of the hydraulic mass, acts on all sides of the space containing the mass. To compensate for any loss in the axial load or force, only the force component acting in the direction of the dowel assembly axis is useful. The pressure acting transversely of the dowel assembly axis can generate frictional forces which impair the axial expansion of the container. To avoid such a situation, it is advantageous if the space formed in at least one of the two parts of the container has a cross-section enlarging in the direction toward the other part. With such an enlargement of the space, the free expansion of the hydraulic mass in the axial direction is possible.

The surface of the hydraulic mass space with the cross-section enlarging toward the other part can, in principle, be formed as a fluted surface. For a simple arrangement, however, it is preferable if the walls of the hydraulic mass space define a cross-section enlarging toward the other part in a generally V-shaped manner. Such shaped surfaces do not require any special tooling or machinery for the fabrication of the container.

The surfaces defining the V-shaped space form an angle in the range of 60° to 120°, and preferably in the range of 70° to 110°.

Within such a range it is assured that the expansion of the mass in the radial direction drives the container parts apart in the axial direction of the dowel assembly so that such movement affords the desired compensation.

For a uniform distribution of the expansion force a symmetrical arrangement of the space holding the hydraulic mass is required. This desired result can be achieved by providing several bores or countersunk sections. It is, however, desirable for a compact construction to arrange the hydraulic mass space as an annular space. An annularly shaped space simplifies the filling operation and enables uniform introduction of the reaction liquid into the mass.

During the application of axial force on the dowel assembly, apart from the hydraulic mass, the container is also exposed to the forces generated. To enable a controlled elastic deformation of the container, it is advantageous to provide an annular gap extending around the hydraulic mass space in at least one of the two parts forming the container with the height of one side of the annular container being less than the height of the other side. The parts of the container thus act like loadable plate springs. The annular groove also enables the introduction of the reaction liquid into the hydraulic mass for effecting the expansion of the mass.

The expanded hydraulic mass can be of such a cohesive form that after it has set it can no longer flow out of the space. For reasons of appearance as well as to protect the hydraulic mass from surrounding influences, it is advantageous if the two parts of the container are formed so that one telescopes into the other. With such an arrangement, special sealing means are not required nor is high fitting accuracy.

The hydraulic mass can be mixed with the materials required for the setting procedure outside of the container, such as in a mixing device. Such a procedure, however, is cumbersome and requires special training for the personnel carrying out the mixing operation. It is much simpler if the hydraulic mass is filled into the container at the outset. Since these hydraulic masses are mostly mineral materials which set due to the addition of liquid, such as water, it is appropriate if the container has openings through which the reaction liquid can be introduced. The container holding the dry hydraulic mass can be stored without any problems and, prior to use, can be immersed into the appropriate reaction liquid so that the liquid passes through the openings into the space within the container and initiates the setting process. Any premature passage of humidity can be prevented by an appropriate packaging of the container. In another possible arrangement, the dry hydraulic mass and the reaction liquid required for the setting process are held separate from one another within destructible sheaths within the container. During use the two parts of the container can be assembled together and the sheaths destroyed by protruding teeth. By turning the parts relative to one another, the components of the hydraulic mass can be mixed and the setting process initiated.

Instead of a single sheath holding all of the reaction liquid, the liquid can be divided into separate parts and arranged, for instance, in microcapsules which can be broken by applying outside pressure.

A number of possibilities exist for the make-up of the hydraulic mass capable of expanding. In practical tests it has been shown to be advantageous if the hydraulic mass contains the following:

22–85% by weight of expandable components,
12–76% by weight of hydraulic binders,
0–02% by weight of additives,
0–10% by weight of fillers.

As the expandable component calcined lime (CaO) would be preferable. In addition, magnesium oxide (MgO), gypsum, aluminum oxide ($Al_2O_3$) or similar materials could be used. The additives can be expansion retardants, rapid setting agents, liquifiers and the like. Quartz sand can be used as a filler.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a sectional view of an expansion dowel assembly including a container embodying the present invention under axial load;

FIG. 2 is a view similar to FIG. 1, however, illustrating the expansion dowel assembly after partial release or relaxation by the receiving material;

DETAILED DESCRIPTION OF THE INVENTION

Figure 3:
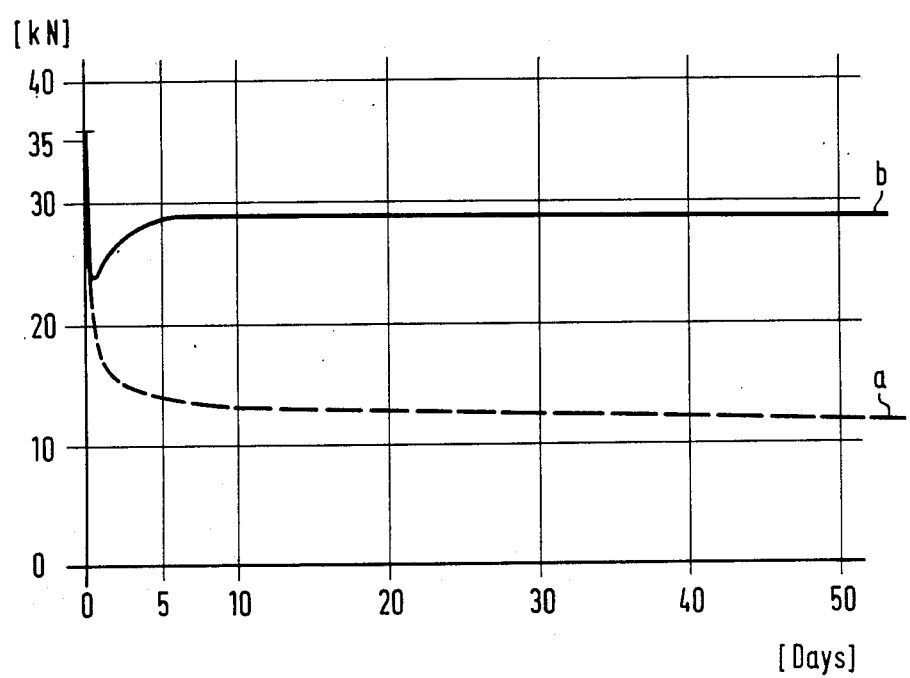
FIG. 3 is a graphical representation of the application of the axial load to the dowel assembly, with and without load balancing container.

In FIGS. 1 and 2 a dowel assembly is illustrated made up of an axially elongated anchor bolt 1 with a hexagonal head 1a at its trailing end with the head forming an abutment and it has a thread 1b extending from its leading end. Anchor bolt 1 is laterally enclosed by a dowel sleeve 2. Dowel sleeve 2 has an inside bore extending from its leading end to its trailing end. At the leading end the surface forming the bore 2a converges inwardly in the direction toward the trailing end with the major portion of the axial length of the bore being cylindrically shaped. An expansion member 3 is located on the threaded part 1b of the dowel 1 and bears against the surface of the conically shaped part of the bore 2a. To facilitate its expandibility, the dowel sleeve 2 is provided with longitudinal slits 2b extending from its leading end toward the trailing end. A washer 4 is located on the underside of the hexagonal head 1a. The dowel assembly is inserted into a borehole 5a in a receiving material 5. The dowel assembly serves to secure a component 6 to the surface of the receiving material 5 in which the borehole 5a is formed. The component 6 has an opening therethrough with a diameter slightly greater than the outside diameter of the dowel sleeve 2. An annular shaped container 7 is positioned between the washer 4 and the adjacent surface of the component 6. The container 7 extends around the outside surface of the dowel sleeve 2. Container 7 is made up of a bottom part 7a and a cover part 7b which is shaped to fit into the bottom part. The cover part 7b fits telescopically into the bottom part 7a. An hydraulic mass 8 capable of expanding or swelling is located within the container 7, that is, within an annular channel formed by the bottom part 7a. In addition, the bottom part 7a has openings 7c for introducing the reaction liquid into the hydraulic mass 8.

Prior to being placed on the dowel, the container is immersed in a reaction liquid which passes through the openings 7c into the hydraulic mass 8 and is absorbed by the mass.

At most, this step only takes several minutes. Subsequently, the annular container 7 is slipped over the dowel sleeve 2 and the dowel assembly including the anchor bolt 1, the dowel sleeve 2 and the expansion member 3 are inserted through the opening 6a in the component 6 and then into the borehole 5a in the receiving material. An axial load is applied to the dowel assembly by applying a torque at the hexagonal head 1a rotating the anchor bolt and drawing the expansion member 3 into the dowel sleeve 2 so that the leading portion of the sleeve is expanded radially outwardly into engagement with the surface of the borehole 5a. The clamping length of the dowel assembly located in the receiving material is indicated by $L_1$ in FIG. 1. After the dowel assembly has been anchored, due to a relaxation of the stress developed in the receiving material 5, the clamping length $L_1$ is reduced by the amount $L_2$ with the resulting clamping length $L_3$ as shown in FIG. 2. The change in length $L_2$ is shown somewhat exaggerated in FIG. 2. In a conventional dowel assembly the clamping length provided by the anchor bolt 1 would be reduced by the amount $L_2$ and the axial load acting on the anchor bolt would be correspondingly reduced. Due to the expansion developed in the hydraulic mass 8 in the container 7 when the reaction liquid is introduced into it, the cover part 7b is displaced in the axial direction of the anchor bolt so that the cover part 7b is moved upwardly relative to the bottom part 7a by the distance s and the axial load originally developed in the anchor bolt is largely maintained. The axial displacement s of the cover part 7b relative to the bottom part 7a corresponds, in the ideal situation, to the length $L_2$.

In the graphical representation afforded in FIG. 3, the chronological progression of the axial load on the dowel assembly is shown for a so-called "heavy duty anchor" of the M16 size. Such an anchor corresponds approximately to the embodiment shown in FIGS. 1 and 2 and is made up basically of a partially axially slit metal sleeve and an expansion body which can be pulled into the sleeve by a threaded bolt. The dowel assembly was axially loaded in concrete up to 36 kN in one instance with the container 7 and in another instance without the container. In both instances, the axial load originally established dropped off considerably after a short time, that is, in approximately one day. While the axial load in the dowel without the equalization container (curve a) continued to drop off below the level of 50% of the originally applied axial load, the load in the dowel with the equalization container (curve b) dropped off and then started to increase again and after 7 days reached approximately 80% of the originally applied axial load. The curve a is shown in dashed lines while the curve b is shown in solid line. As can be seen from the curves, the values remain stable after about 10 days and also for longer periods.

Figure 4:
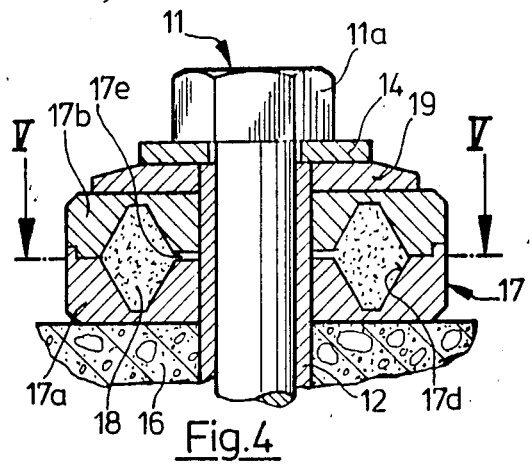
FIG. 4 is a partial side view, similar to FIG. 1, illustrating another embodiment of the container of the present invention.
Figure 5:
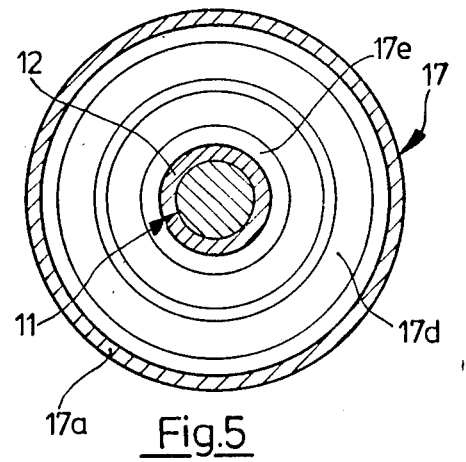
FIG. 5 is a cross-sectional view taken along the line V—V in FIG. 4.
Figure 6:
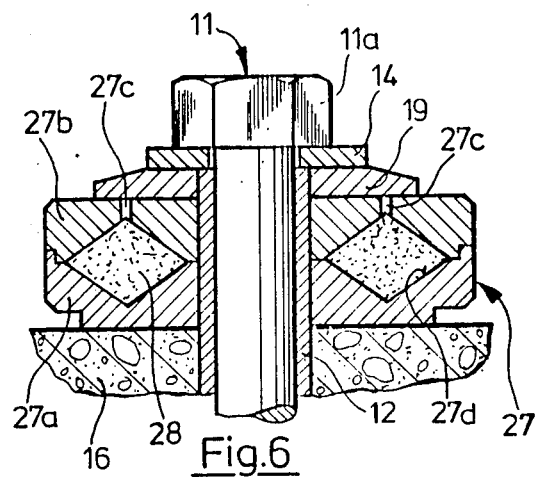
FIG. 6 is a view similar to FIG. 4 showing another embodiment of the container of the present invention.
Figure 8:
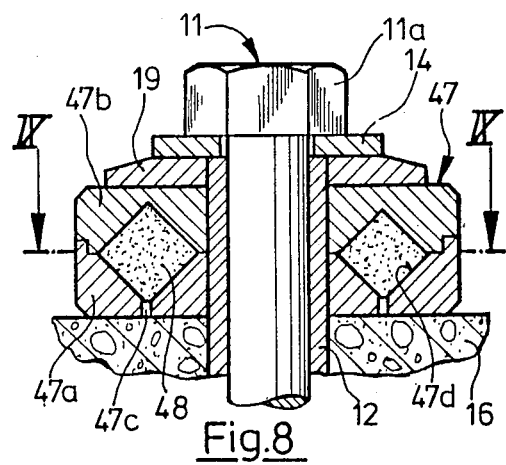
FIG. 8 is view similar to FIGS. 6 and 7 illustrating still another embodiment of the container of the present invention.

In FIGS. 4 to 9 dowel assembly connections are illustrated including anchor bolts 11 each with a trailing hexagonal head 11a and a dowel sleeve 12. A U-washer 14 is located between the underside of the hexagonal head 11a and a component 16. In FIGS. 4, 6 and 8 a cover washer 19 is located between the washer 14 and the container.

In FIGS. 4 and 5 the annular container 17 is made up of two annular parts, a bottom part 17a and an upper or cover part 17b. Together, the two parts 17a, 17b form an annular shaped space 17d for an hydraulic mass 18 capable of being expanded. Around the radially outer edges of the bottom part 17a and the cover part 17b the abutting surfaces are shaped to provide a telescopic interengagement of the cover part into the bottom part. On the radial inner part of the abutting surfaces of the two parts, an annular gap 17e is formed extending radially outwardly from the surface of the sleeve 12 to the radially inner surface of the space 17d. Annular gap 17e serves as a passage for introducing the reaction liquid required for expanding the hydraulic mass 18 into the space 17d in the container 17. In addition, annular gap 17e allows an elastic deformation of the container 17 when the axial load is being applied by the dowel assembly. Accordingly, the container 17 forms a type of spring. Receiving space 17d is located approximately half in the bottom part 17a and half in the cover part 17d and has a V-shaped cross-sectional shape in each of the parts. The V-shaped cross-section of the space 17d in each part is arranged so that the surfaces forming the V-shaped section diverge in the direction toward the other part of the container 7. In this embodiment the walls forming the V-shaped section enclose an acute angle of about 70°. With this arrangement of the hydraulic mass space 17d, a distortion of the mass 18 in the container and friction energy losses are prevented. Accordingly the outside diameter of the container, as compared to the embodiment shown in FIGS. 1 and 2, can be dimensioned to be smaller at the same compressive stress.

In FIG. 6, the container 27 is basically similar to the one illustrated in FIGS. 4 and 5. The container 27 is made up of a bottom part 27a and an upper or cover part 27b. In place of an annular gap as shown in FIG. 4, the cover part 27b is provided with openings 27c extending between the upper surface of the cover part and the apex of the annular space 27d containing the hydraulic mass 28. The openings 27c serve to introduce the reaction liquid into the space 27d. The space 27d is annularly shaped. The surfaces of the space 27d forming the V-shaped part of the space in each of the parts 27a and 27b enclose an obtuse angle about 110°. Such a design of the space 27d affords a larger area of projection in the axial direction and, thus, theoretically higher forces with the same volume of the mass 28 is achieved as the mass 18 in FIG. 4. The abutting surfaces of the bottom part 27 and the cover part 28 are shaped so that the cover part is telescoped into the bottom part.

Figure 7:
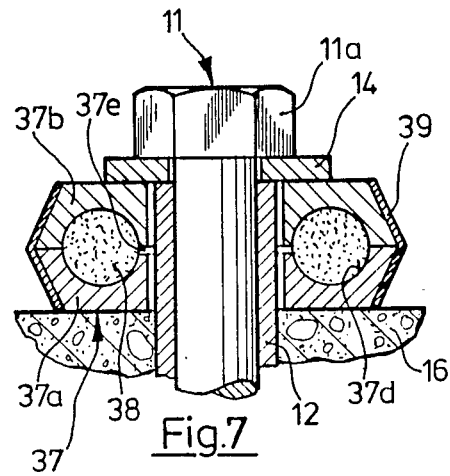
FIG. 7 is a view similar to FIG. 6 displaying yet another embodiment of the container of the present invention.

In FIG. 7 another embodiment is illustrated with a container 37 formed by a bottom part 37a and an upper part 37b. The two parts 37a and 37b are identical and are arranged symmetrically relative to one another and are held together by means of a jacket 39. Jacket 39 is a contracting hose extending around the outer circumferential periphery of both parts. The two parts 37a, 37b define a space 37d between them and the space has a circular cross-section. An annular gap 37e extends from the radially inner surfaces of the two parts 37a, 37b to the inner surface of the space 37d along the plane of the intersection betwen the two parts. Annular gap 37e functions the same as the gap shown in FIGS. 4 and 5 and can be closed off by a water-permeable fiber fleece.

Figure 9:
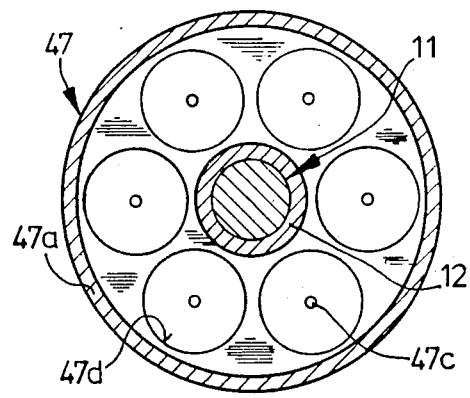
FIG. 9 is a cross-sectional view taken along the line IX—IX in FIG. 8.

Another container 47 is displayed in FIGS. 8 and 9 and is made up of a bottom part 47a and an upper cover part 47b. Both parts 47a, 47b each form half of a space 47d for a hydraulic mass 48. The spaces 47d are formed as conically shaped countersinks each defining an angle of about 90° with the spaces distributed around the contacting peripheral surfaces of the two parts. Bottom part 47a has openings 47c extending downwardly from the base of the receiving spaces 47d to the lower surface of the bottom part. Openings 47c form passageways for introducing the reaction liquid into the hydraulic mass 48. The contacting surfaces of the bottom part 48 and the cover part 47b are shaped so that the cover part is telescopically displaceable within the bottom part.

While specific embodiments of the invention have been shown and described in detail to illustrate the application of the inventive principles, it will be understood that the invention may be embodied otherwise without departing from such principles.

We claim:

1. In a dowel to be anchored in a borehole or the like in a receiving material, such as concrete, masonry or the like, where the dowel assembly is axially elongated includes an abutment arranged to be spaced exteriorly of the receiving material for applying an axial load on said dowel assembly relative to the receiving material, wherein the improvement comprises a container arranged to be positioned between said abutment and the exterior of the receiving material, said container formed so that is expandable only in the axial direction of said dowel assembly, said container defining an interior receiving space, an hydraulic mass capable of expanding when exposed to a reaction liquid located within said receiving space so that said container can expand in the axial direction of the dowel assembly for applying a pressing force on said abutment relative to the receiving material, said container comprises a first part and a second part and said receiving space located at least in one of said parts, and said first and second parts being displaceable in the axial direction of said dowel assembly when said hydraulic mass expands.

2. A dowel assembly, as set forth in claim 1, wherein said receiving space in said at least one of said parts has a cross-section increasing in the direction toward the other said part.

3. A dowel assembly, as set forth in claim 2, wherein said receiving space has surfaces defining a V-shaped crosssection with said surfaces being in diverging relationship in the direction toward the other said part.

4. A dowel assembly, as set forth in claim 3, wherein said diverging surfaces defining said space enclose an angle in the range of 60° to 120°.

5. A dowel assembly, as set forth in claim 4, wherein said diverging surfaces defining said space enclose an angle in the range of 70° to 110°.

6. A dowel assembly, as set forth in one of claims 1 and to 4, wherein said container is an annular container encircling the axis of said dowel assembly and said space for said hydraulic mass is an annular space within said annular container, and said hydraulic mass is a settable substance.

7. A dowel assembly, as set forth in claim 6, wherein said parts forming said container have an annular inner side and an annular outer side extending in the axial direction of said dowel assembly and one of the inner side or outer side of one of said parts has a smaller dimension in the axial direction of the dowel assembly than the other said side for forming an annular gap extending from said side to said space within said container.

8. A dowel assembly, as set forth in one of claims 1 to 5, wherein one of said parts of said container is shaped to be telescopically displaceable within the other said part.

9. A dowel assembly, as set forth in claim 1, wherein said container having openings therein extending from the outside surface of said container to said space for said hydraulic mass and said openings serving to flow a reaction liquid into said space.

10. A dowel assembly, as set forth in claim 1, wherein said hydraulic mass comprises the following:
22–85% by weight of at least one expandable component
12–76% by weight of at least one hydraulic binder
0–2% by weight of at least one additive and
0–10% by weight of at least one filler.

* * * * *